United States Patent
Hong

(10) Patent No.: US 11,974,323 B2
(45) Date of Patent: Apr. 30, 2024

(54) METHOD AND DEVICE FOR TRANSMITTING RANDOM ACCESS INDICATION INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 421 days.

(21) Appl. No.: 17/287,819

(22) PCT Filed: Oct. 31, 2018

(86) PCT No.: PCT/CN2018/113155
§ 371 (c)(1),
(2) Date: Apr. 22, 2021

(87) PCT Pub. No.: WO2020/087380
PCT Pub. Date: May 7, 2020

(65) Prior Publication Data
US 2021/0385869 A1    Dec. 9, 2021

(51) Int. Cl.
*H04W 74/0833* (2024.01)
*H04W 74/00* (2009.01)

(52) U.S. Cl.
CPC ..... *H04W 74/0833* (2013.01); *H04W 74/002* (2013.01)

(58) Field of Classification Search
CPC .......... H04W 74/0833; H04W 74/006
See application file for complete search history.

(56) References Cited

U.S. PATENT DOCUMENTS

| 2018/0110074 | A1* | 4/2018 | Akkarakaran | H04W 72/21 |
| 2018/0324862 | A1* | 11/2018 | Mallick | H04W 48/10 |
| 2021/0168877 | A1* | 6/2021 | Wang | H04W 74/0833 |
| 2021/0195405 | A1* | 6/2021 | Gurumoorthy | H04W 76/27 |
| 2021/0227577 | A1* | 7/2021 | Yang | H04L 1/0071 |
| 2021/0227592 | A1* | 7/2021 | Frederiksen | H04W 74/0833 |

FOREIGN PATENT DOCUMENTS

| CN | 108282816 A | 7/2018 |
| WO | WO 2018075256 A1 | 4/2018 |
| WO | WO 2018085726 A1 | 5/2018 |

OTHER PUBLICATIONS

Indian Patent Application No. 202147022992 Office Action dated Feb. 23, 2022, 5 pages.
European Patent Application No. 18939123.8 extended Search and Opinion dated May 12, 2022, 9 pages.
PCT/CN2018/113155 English translation fo the International Search Report dated Jul. 26, 2019, 2 pages.

* cited by examiner

*Primary Examiner* — Barry W Taylor
(74) *Attorney, Agent, or Firm* — COZEN O'CONNOR

(57) ABSTRACT

A method and a device for transmitting random access indication information may include a base station that generates indication information about random access, in which the indication information is configured to indicate trigger reasons for a 2-step contention-based random access. The base station broadcasts a system message to a user device, the system message including the indication information.

8 Claims, 7 Drawing Sheets

METHOD AND DEVICE FOR TRANSMITTING RANDOM ACCESS INDICATION INFORMATION

This application is the US national phase application of International Application No. PCT/CN2018/113155, filed on Oct. 31, 2018, the entire contents of which are incorporated herein by reference.

FIELD

The present disclosure relates to the field of communication technologies, and more particularly to a method and a device for transmitting random access indication information.

BACKGROUND

In the related art, in 5G (the fifth generation of mobile communication system), user devices often carry out random access process based on business needs. In 5G unlicensed bands, Listen before Talk (LBT) must be followed. Under the LBT principle, it is possible to cause random access delays. In order to improve a success rate of random access, contention-based random access may be shortened to 2 steps. Then, for the contention-based random access, base stations and user devices can support both a 2-step and a 4-step implementation. However, when to adopt the 2-step contention-based random access, when to adopt the 4-step contention-based random access and how to notify about it are urgent problems to be solved.

SUMMARY

Embodiments of the present disclosure provide a method and a device for transmitting random access indication information. The technical solutions are as follows.

According to a first aspect of embodiments of the present disclosure, a method for transmitting random access indication information is provided. The method is applied to a base station side, and includes: generating indication information about random access, the indication information being configured to indicate trigger reasons for a 2-step contention-based random access; and broadcasting a system message to a user device, the system message comprising the indication information.

According to a second aspect of embodiments of the present disclosure, a method for transmitting random access indication information is provided. The method is applied to a user device side, and includes:

receiving a system message broadcasted by a base station, the system message comprising indication information, the indication information being configured to indicate trigger reason for a 2-step contention-based random access; and performing a 2-step contention-based random access in response to satisfying the trigger reason.

According to a third aspect of embodiments of the present disclosure, a method for transmitting random access indication information is provided. The method is applied to a user device side, and includes:

determining whether a preset trigger reason is satisfied; and performing a 2-step contention-based random access when the preset trigger reason is satisfied.

According to a fourth aspect of embodiments of the present disclosure, a device for transmitting random access indication information is provided. The device includes:

a processor; and a memory configured to store instructions executable by the processor;

wherein, the processor is configured to:

generate indication information about random access, the indication information being configured to indicate trigger reasons for a 2-step contention-based random access; and broadcast a system message to a user device, the system message comprising the indication information.

According to a fifth aspect of embodiments of the present disclosure, a device for transmitting random access indication information is provided. The device includes:

a processor; and a memory configured to store instructions executable by the processor;

wherein, the processor is configured to:

receive a system message broadcasted by a base station, the system message comprising indication information, the indication information being configured to indicate trigger reason for a 2-step contention-based random access; and perform a 2-step contention-based random access in response to satisfying the trigger reason.

According to a sixth aspect of embodiments of the present disclosure, a device for transmitting random access indication information is provided. The device includes:

a processor; and a memory configured to store instructions executable by the processor;

wherein, the processor is configured to:

determine whether a preset trigger reason is satisfied; and perform a 2-step contention-based random access when the preset trigger reason is satisfied.

According to a seventh aspect of embodiments of the present disclosure, a computer readable storage medium having computer instructions stored thereon is provided. When the instructions are executed by a processor, the method at the base station side described above is implemented.

According to an eighth aspect of embodiments of the present disclosure, a computer readable storage medium having computer instructions stored thereon is provided. When the instructions are executed by a processor, the method at the user device side described above in the second aspect is implemented.

According to a ninth aspect of embodiments of the present disclosure, a computer readable storage medium having computer instructions stored thereon is provided. When the instructions are executed by a processor, the method at the user device side described above in the third aspect is implemented.

It should be understood that the above general description and the following detailed description are for exemplary and illustrative purposes only and do not limit the scope of the present application.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

The exemplary embodiments are described in detail here, and examples of which are shown in the attached drawings. Where the following description refers to drawings, the same numerals in different drawings indicate the same or similar elements, unless otherwise indicated. The implementations described in the following exemplary embodiments do not represent all implementations consistent with the invention. Rather, they are only examples of devices and methods consistent with some aspects of the invention as detailed in the attached claims.

In the related art, in 5G system, random access is divided into contention-based random access and non-contention-based random access. Among them, the contention-based random access is divided into four steps.

At step 1, a user device (UE) sends a random access preamble, for requesting random access.

At step 2, a base station feeds back a random access response (RAR). The UE decodes the RAR with a random access radio network temporary identifier (RA-RNTI).

At step 3, the UE sends a random response message 3. The random response message 3 may include a temporary cell radio network temporary identifier (TC-RNTI).

At step 4, the base station feeds back a random response message 4. The random response message 4 includes a cell radio network temporary identifier (C-RNTI).

In the design of 5G independent networking in unlicensed spectrum, it is necessary to follow the LBT (listen before talk) mechanism. That is, in the process of random access, both uplinks and downlinks need to monitor the channel before sending messages. If there is no available time-frequency resource, delay will increase and the efficiency of random access will be affected. Therefore, one possible solution is to change the contention-based random access to a 2-step implementation, that is, to combine the information in steps 1 and 3 into a single message for sending, and combine the information in steps 2 and 4 into a single message for sending. Thus, the base station may support both 2-step and 4-step contention-based random access, or support only 4-step contention-based random access. This leads to the problem that UE does not know which contention-based random access process to adopt.

In order to solve the above problems, in embodiments, the system message is improved and added with indication information configured to indicate trigger reasons for a 2-step contention-based random access.

Figure 1:
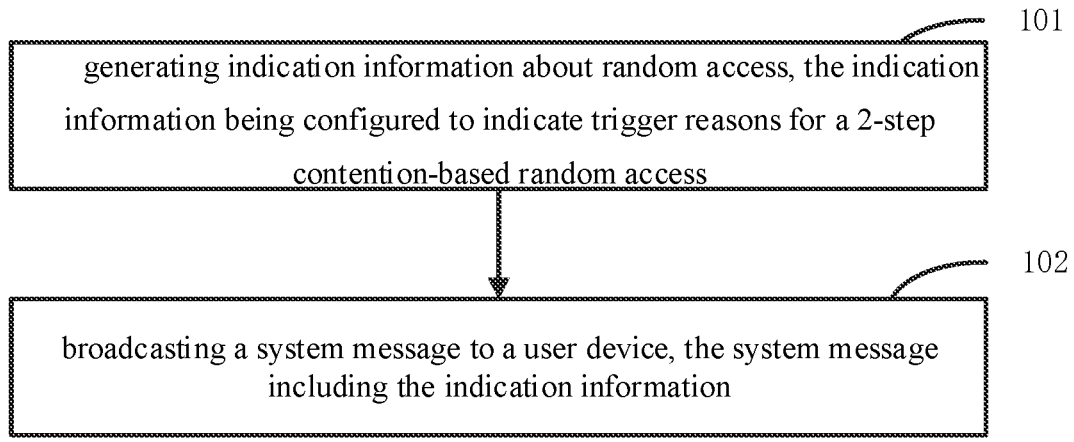
FIG. 1 is a flowchart of a method for transmitting random access indication information according to an exemplary embodiment.

FIG. 1 is a flowchart of a method for transmitting random access indication information according to an example embodiment. The method for transmitting random access indication information is applied to a network access device such as a base station. As illustrated in FIG. 1, the method includes following steps 101-102.

At step 101, indication information about random access is generated. The indication information is configured to indicate trigger reasons for a 2-step contention-based random access.

At step 102, a system message is broadcasted to a user device. The system message includes the indication information.

In this embodiment, the base station may broadcast the system message, i.e., broadcast the trigger reasons, periodically or based on actual needs, to indicate the UE to adopt the 2-step contention-based random access when satisfying the trigger reason and adopt the 4-step contention-based random access when not satisfying the trigger reasons. This embodiment is suitable for the UE supporting the 2-step contention-based random access.

In an embodiment, the trigger reasons include business types and/or application scenarios.

In embodiments, the trigger reasons may include trigger reasons sensitive to latency. The business types include business types sensitive to latency, for example, live video. The application scenarios include application scenarios sensitive to latency, for example, connection recovery. The above trigger reasons all have higher requirements for latency, and wish to reduce latency as much as possible, and thus it is more suitable to adopt the 2-step contention-based random access.

For example, the UE adopts the 2-step contention-based random access when it needs to initiate random access due to a new live video business. For another example, the UE adopts the 2-step contention-based random access when it needs to initiate random access for connection recovery.

In an embodiment, the indication information includes a value n. The value n indicates first n trigger reasons in preconfigured m trigger reasons, where m and n are preset parameters and are both integers.

In embodiments, the system configures a trigger reason list for the base station and the UE in advance, an example of which is as shown in Table 1.

TABLE 1

| Number | Trigger reason |
| --- | --- |
| 1 | Live video |
| 2 | Connection recovery |
| 3 | Video phone |
| ... | ... |
| m | ... |

The trigger reasons in Table 1 may be ranked from highest to lowest in terms of importance and frequency. The base station selects the first N trigger reasons according to needs. The indication information n is broadcast to the UE via the system message. The minimum value of n is 0, which means that there is no trigger reason applicable to the 2-step contention-based random access, that is, only 4-step contention-based random access can be adopted. The maximum value of n is m, that is, all trigger reasons are applicable to the 2-step contention-based random access.

After receiving the indication information n, the UE queries Table 1, and determines the first n trigger reasons. When at least one of the first n trigger reasons is satisfied, the 2-step contention-based random access is adopted.

When Table 1 changes, the system needs to reconfigure the base station and the UE.

In an embodiment, the system message includes indication bits configured to carry the indication information. The indication bits are configured to represent the value n, and a number of bits occupied by the indication bits is determined by the total number m of the preconfigured trigger reasons.

In this embodiment, the indication information is represented by the indication bits. The number of bits occupied by the indication bits is determined by m. For example, m=8, and the number of bits occupied by the indication bits is 3. The number of bits occupied by the indication bits may be the minimum number of bits required for representing m. The indication information includes the value n. No matter what the value of n is, the length of the indication bits does not change. For example, m=8, n=4, and then the value of indication bits is 011.

The implementation process at the base station side is illustrated above. Correspondingly, the process at the UE side has also been improved. The implementation process at the UE side is described below.

Figure 2:
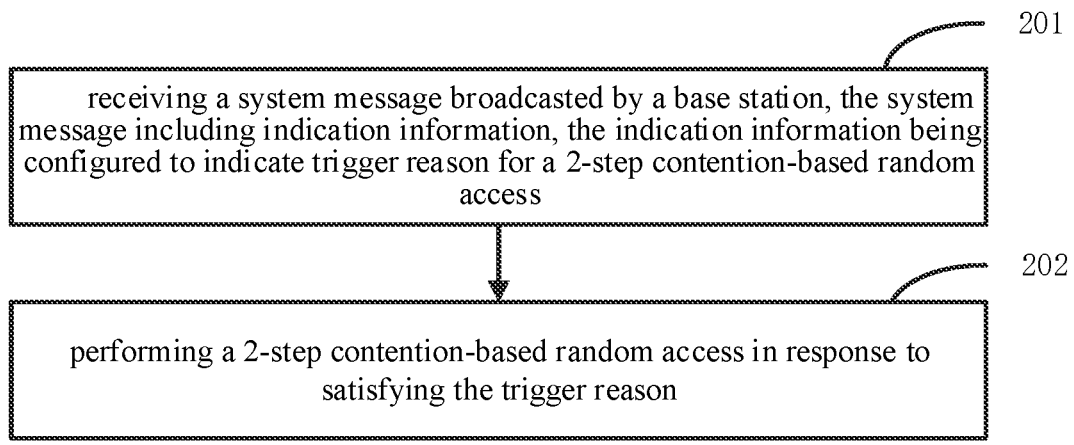
FIG. 2 is a flowchart of a method for transmitting random access indication information according to an exemplary embodiment.

FIG. 2 is a flowchart of a method for transmitting random access indication information according to an exemplary embodiment. The method for transmitting random access indication information is applied to UE. The UE may be a mobile phone, a computer, a digital broadcast terminal, a messaging device, a game console, a tablet device, a medical device, a fitness device, a personal digital assistant, etc. As illustrated in FIG. 2, the method includes following steps 201-202.

At step 201, a system message broadcast by a base station is received. The system message includes indication information. The indication information is configured to indicate trigger reasons for a 2-step contention-based random access.

At step 202, the 2-step contention-based random access is performed when the trigger reason is satisfied.

In this embodiment, the base station may broadcast the system message periodically or according to actual needs. The UE may receive the system message periodically or temporarily. When the UE needs to perform random access, the UE determines the trigger reason for the current random access, and judges whether the trigger reason satisfies the trigger reasons indicated by the last system message, if yes, performs the 2-step contention-based random access, and if no, preforms the 4-step contention-based random access.

In an embodiment, the trigger reasons include business types and/or application scenarios.

When the UE needs to perform random access, the UE determines the trigger reasons for the current random access, in which the trigger reasons may include the reason in terms of business type and the reason in terms of application scenario. When at least one of the reasons satisfies the trigger reasons indicated by the system message, it is determined that the condition is satisfied, and then the 2-step contention-based random access is performed. Certainly, when both the reason in terms of business type and the reason in terms of application scenario satisfy the trigger reasons indicated by the system message, it is determined that the condition is satisfied, and then the 2-step contention-based random access is performed.

In an embodiment, the indication information includes a value n. The value n indicates first n trigger reasons in preconfigured m trigger reasons, where n and m are preset parameters and are both integers.

Step 202 includes step A.

In step A, when at least one of the first n trigger reasons indicated by the indication information is satisfied, the 2-step contention-based random access is performed.

Continuing with the previous example, Table 1 is preconfigured for the UE. When random access is needed, UE determines the trigger reason for the current random access, and determines the value N sent by the last system message. By querying Table 1 with this value N, the first N trigger reasons indicated by the base station are determined. The UE determines whether the trigger reason for the current random access meets at least one of the first N trigger reasons, if so, then perform the 2-step contention-based random access, and if no, then perform the 4-step contention-based random access.

In an embodiment, the system message includes the indication bits for carrying the indication information. The indication bits are configured to represent the value n, and a number of bits occupied by the indication bits is determined according to a total number m of the preconfigured trigger reasons.

Continuing with the previous example, Table 1 is preconfigured for the UE. Therefore, the length of the indication bits may be determined by the UE with knowing the value of the total number m. For example, m=8 indicates that the indication bits occupy 3 bits. The UE can read the indication bits of the known length when parsing the system message, so as to identify the indication information and obtain the value n.

In the following, the implementation is illustrated in combination with both the base station side and the UE side.

Figure 3:
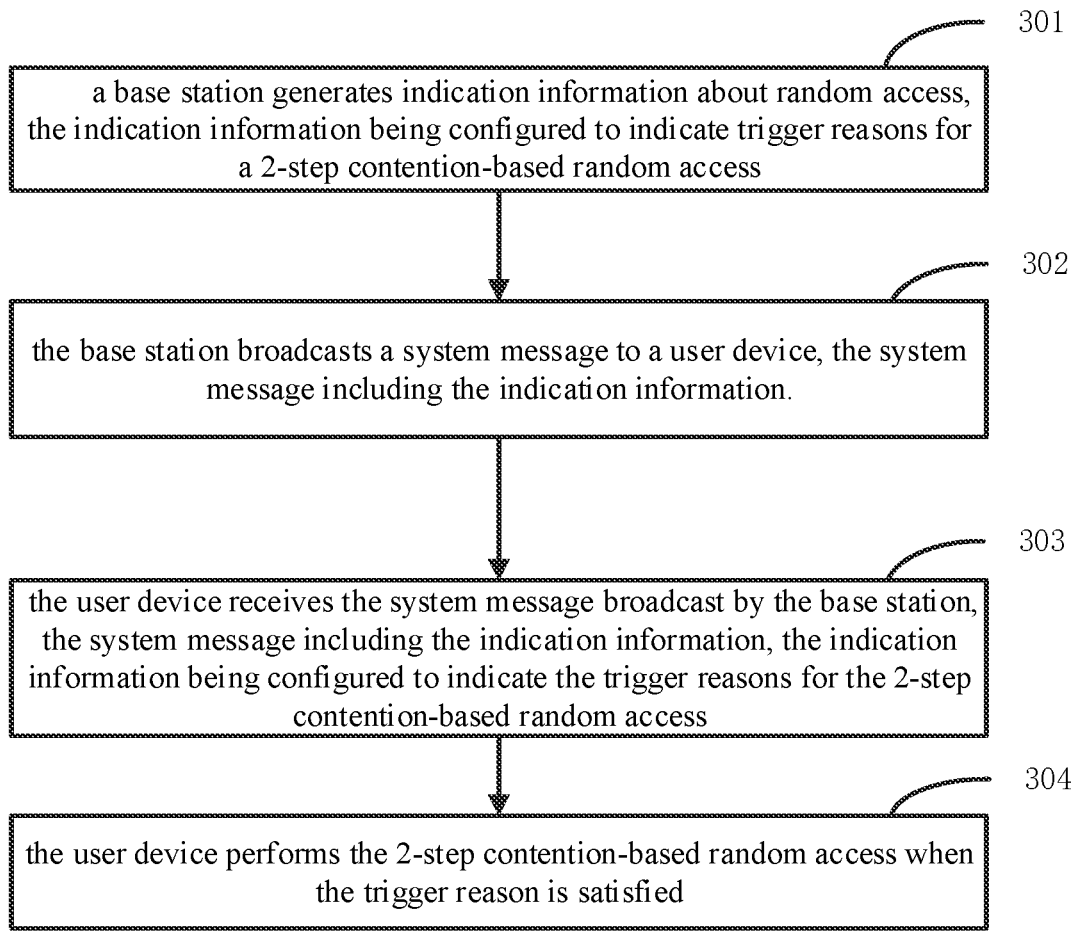
FIG. 3 is a flowchart of a method for transmitting random access indication information according to an exemplary embodiment.

FIG. 3 is a flowchart of a method for transmitting random access indication information according to an exemplary embodiment. As illustrated in FIG. 3, the method includes following steps 301-304.

At step 301, a base station generates indication information about random access. The indication information is configured to indicate trigger reasons for a 2-step contention-based random access.

At step 302, the base station broadcasts a system message to a user device. The system message includes the indication information.

At step 303, the user device receives the system message broadcast by the base station. The system message includes the indication information. The indication information is configured to indicate the trigger reasons for the 2-step contention-based random access.

At step 304, the user device performs the 2-step contention-based random access when the trigger reason is satisfied.

There may be another implementation, in which the system configures Table 1 for the base station and the UE in advance. The base station does not need to broadcast the system message to the UE. When any one of the trigger reasons in Table 1 is met by default, the UE performs the 2-step contention-based random access, which is equivalent to the situation of n=m, and reference may be made to the following embodiment.

Figure 4:
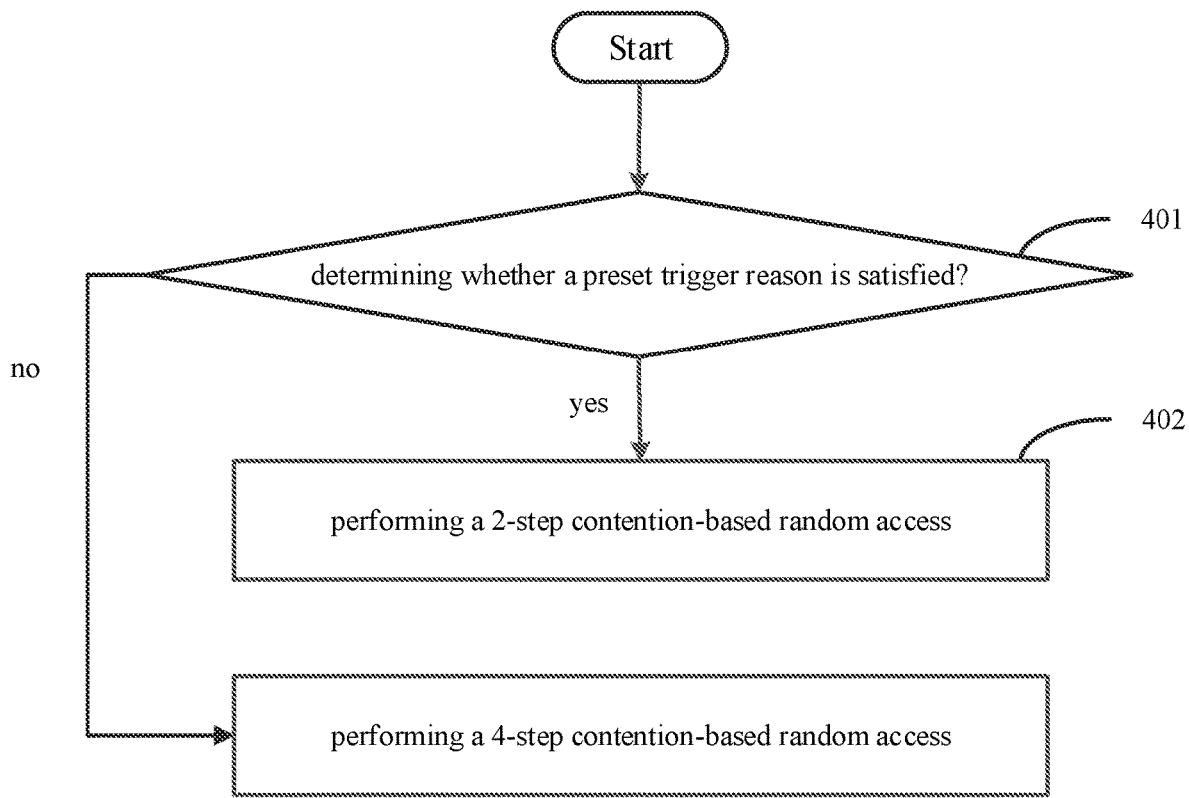
FIG. 4 is a flowchart of a method for transmitting random access indication information according to an exemplary embodiment.

FIG. 4 is a flowchart of a method for transmitting random access indication information. The method for transmitting random access indication information is applied to UE. The UE may be a mobile phone, a computer, a digital broadcast terminal, a messaging device, a game console, a tablet device, a medical device, a fitness device, a personal digital assistant, etc. As illustrated in FIG. 4, the method includes following steps 401-402.

At step 401, it is determined whether a preset trigger reason is satisfied.

At step 402, a 2-step contention-based random access is performed when the trigger reason is satisfied.

In this embodiment, when random access is needed, the UE determines the trigger reason for the current random access, and determines whether the trigger reason satisfies one trigger reason configured by the system, if so, performs the 2-step contention-based random access, and if no, performs the 4-step contention-based random access.

The above embodiments may be combined freely according to actual needs.

The following are apparatus embodiments of the present disclosure, which may be configured to execute method embodiments of the present disclosure.

Figure 5:
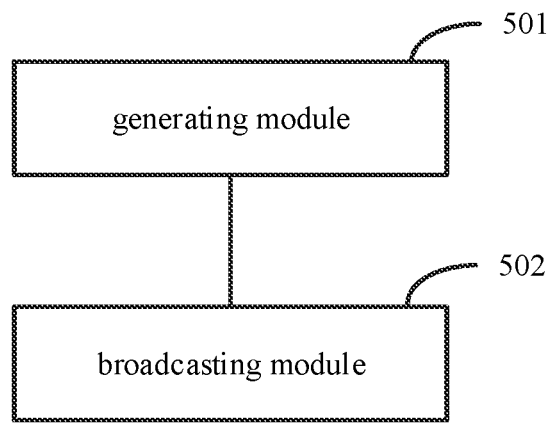
FIG. 5 is a bock diagram of an apparatus for transmitting random access indication information according to an exemplary embodiment.

FIG. 5 is a block diagram of an apparatus for transmitting random access indication information according to an exemplary embodiment. The apparatus may be implemented as a part or a whole of an electronic device by software, hardware or a combination thereof. The apparatus is applied to a base station side, and referring to FIG. 5, the apparatus includes a generating module 501 and a broadcasting module 502.

The generating module 501 is configured to generate indication information about random access, the indication information being configured to indicate trigger reasons for a 2-step contention-based random access.

The broadcasting module 502 is configured to broadcast a system message to a user device, the system message comprising the indication information.

In an embodiment, the trigger reasons include business types and/or application scenarios.

In an embodiment, the indication information includes a value n. The value n indicates first n trigger reasons in preconfigured m trigger reasons, where n and m are predetermined parameters and are both integers.

In an embodiment, the system message includes indication bits configured to carry the indication information. The indication bits are configured to represent the value n, and a number of bits occupied by the indication bits is determined by a total number m of the preconfigured trigger reasons.

Figure 6:
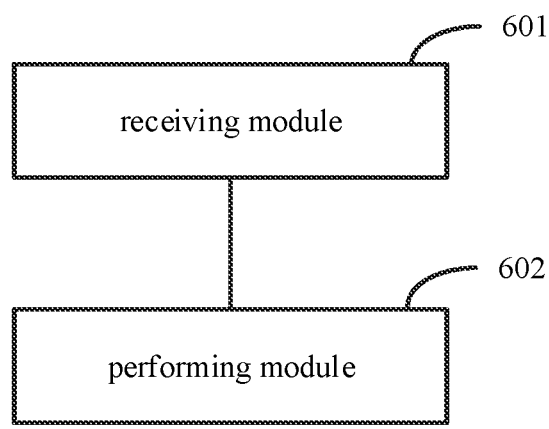
FIG. 6 is a block diagram of an apparatus for transmitting random access indication information according to an exemplary embodiment.

FIG. 6 is a block diagram of an apparatus for transmitting random access indication information according to an exemplary embodiment. The apparatus may be implemented as a part or a whole of an electronic device by software, hardware or a combination thereof. The apparatus is applied to a UE side, and referring to FIG. 6, the apparatus includes a receiving module 601 and a performing module 602.

The receiving module 601 is configured to receive a system message broadcasted by a base station, the system message including indication information, the indication information being configured to indicate trigger reason for a 2-step contention-based random access.

The performing module 602 is configured to perform a 2-step contention-based random access in response to satisfying the trigger reason.

In an embodiment, the trigger reasons include business types and/or application scenarios.

In an embodiment, the indication information includes a value n, in which the value n indicates first n trigger reasons in preconfigured m trigger reasons, where n and m are predetermined parameters and are both integers.

Figure 7:
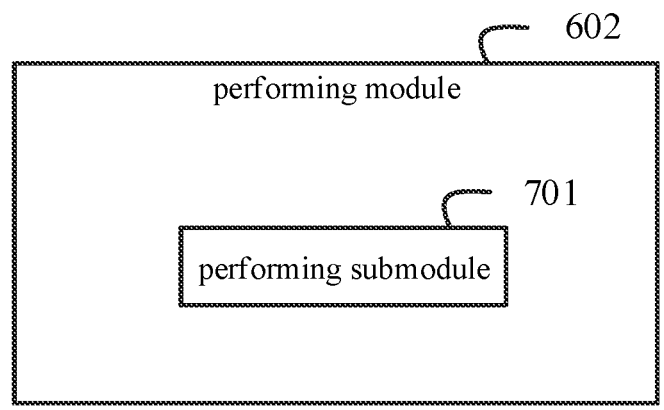
FIG. 7 is a block diagram of a performing module according to an exemplary embodiment.

As illustrated in FIG. 7, the performing module 602 includes a performing submodule 701.

The performing submodule 701 is configured to perform the 2-step contention-based random access in response to satisfying at least one of the first n trigger reasons in the preconfigured m trigger reasons.

In an embodiment, the system message includes indication bits configured to carry the indication information, the indication bits are configured to represent the value n, and a number of bits occupied by the indication bits is determined by a total number m of the preconfigured trigger reasons.

Figure 8:
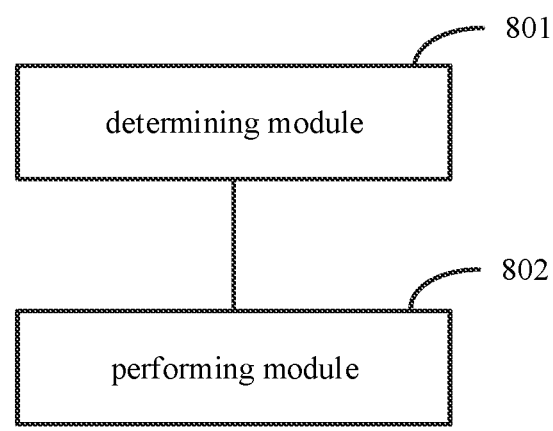
FIG. 8 is a bock diagram of an apparatus for transmitting random access indication information according to an exemplary embodiment.

FIG. 8 is a block diagram of an apparatus for transmitting random access indication information according to an exemplary embodiment. The apparatus may be implemented as a part or a whole of an electronic device by software, hardware or a combination thereof. The apparatus is applied to a UE side, and referring to FIG. 8, the apparatus includes a determining module 801 and a performing module 802.

The determining module 801 is configured to determine whether a preset trigger reason is satisfied.

The performing module 802 is configured to perform a 2-step contention-based random access when the preset trigger reason is satisfied.

With respect to more illustration of the apparatus, reference may be made to the description of method embodiments.

With respect to the apparatus in above embodiments, detailed implementation of operations performed by respective modules have been described in detail in embodiments of related method, which will not be elaborated here.

Figure 9:
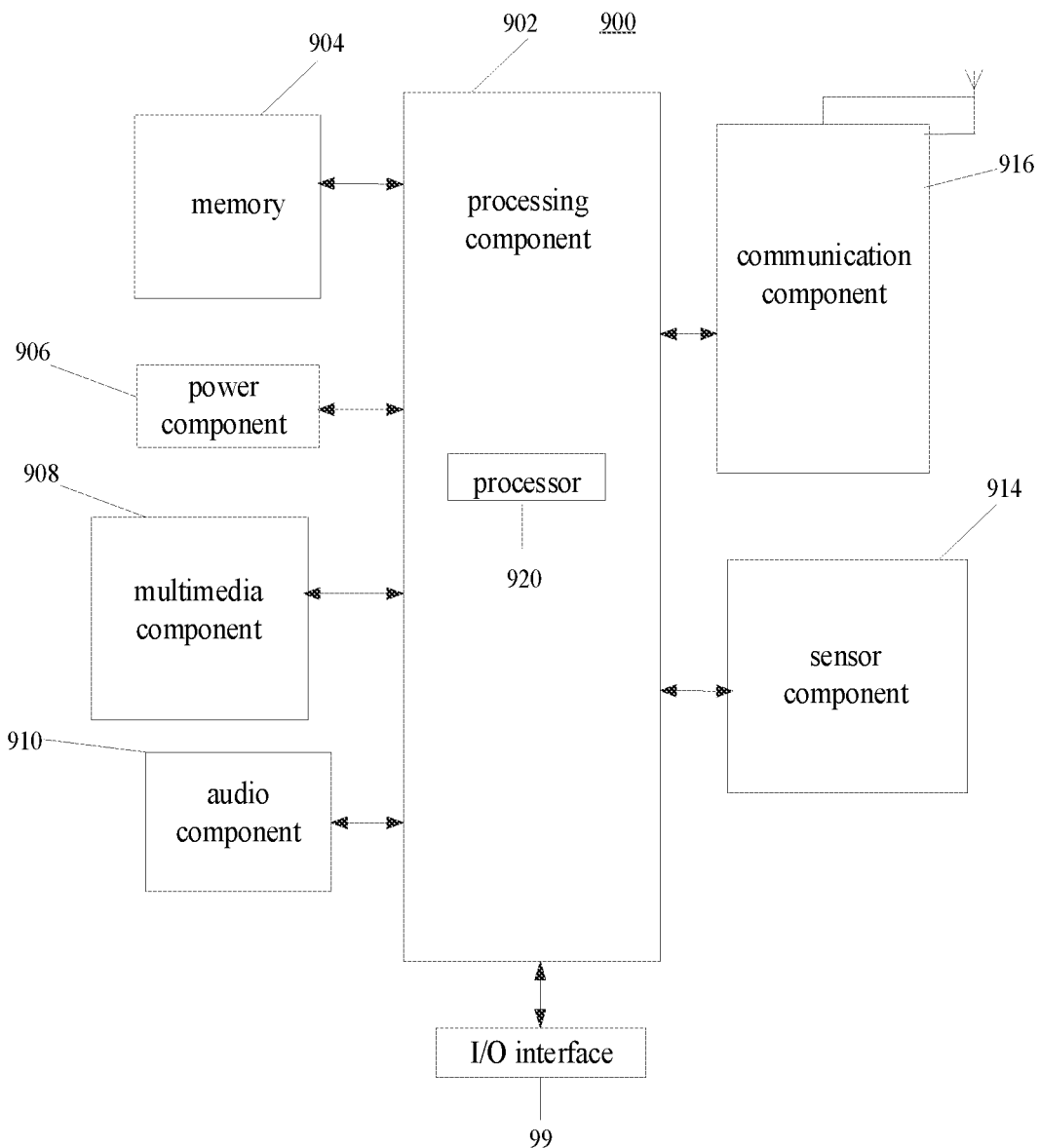
FIG. 9 is a block diagram of a device for transmitting random access indication information according to an exemplary embodiment.

FIG. 9 is a schematic diagram illustrating another structure of a device for transmitting random access indication information according to an exemplary embodiment. For example, the device 900 may be a smartphone, a computer, a digital broadcasting terminal, a tablet device, a massage transmitter/receiver, a game console, a medical device, a fitness device, a personal digital assistant, etc.

The device 900 may include one or more of the following components: a processing component 902, a memory 904, a power component 906, a multimedia component 908, an audio component 910, an input/output (I/O) interface 99, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the device 900 is in an operation mode, such as a shooting mode or a video mode, the front camera and/or the rear camera can receive external multimedia data. Each front camera and rear camera can be a fixed optical lens system or have focal length and optical zoom capabilities.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 99 provides an interface between the processing component 902 and peripheral interface modules, such as a keyboard, a click wheel, buttons, and the like. The buttons may include but are not limited to: home button, volume button, start button, and lock button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of a target object contact with the device 900, an orientation or an acceleration/deceleration of the device 900, and a change in temperature of the device 900. The sensor assembly 914 may include a proximity sensor configured to detect the presence of nearby objects without any physical contact. The sensor component 914 may also include a light sensor, such as a CMOS or CCD image sensor, applicable for imaging applications. In some embodiments, the sensor component 2014 may also include an acceleration sensor, a gyroscope sensor, a magnetic sensor, a pressure sensor or a temperature sensor.

The communication component 916 is configured to facilitate communication, wired or wirelessly, between the device 900 and other devices. The device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to execute the method according to any of the above embodiments.

In exemplary embodiments, there is also provided a computer readable storage medium such as a memory 904 stored instructions, the instructions may be executed by a processor 920 of the device 900 to implement the method mentioned above. For example, the readable storage medium may be a ROM, a RAM, a CD-ROM, a magnetic tape, a floppy disc, an optical data storage device, and the like.

In exemplary embodiments, a device for transmitting random access indication information is provided. The device includes:

a processor; and a memory configured to store instructions executable by the processor;

in which, the processor is configured to:

receive a system message broadcasted by a base station, the system message comprising indication information, the indication information being configured to indicate trigger reason for a 2-step contention-based random access; and perform a 2-step contention-based random access in response to satisfying the trigger reason.

The above processor may be further configured as:

the trigger reasons include business types and/or application scenarios.

The above processor may be further configured as:

the indication information includes a value n, the value n indicating first n trigger reasons in preconfigured m trigger reasons, where n and m are predetermined parameters and are both integers;

performing the 2-step contention-based random access in response to satisfying the trigger reason includes:

performing the 2-step contention-based random access in response to satisfying at least one of the first n trigger reasons in the preconfigured m trigger reasons.

The above processor may be further configured as:

the system message includes indication bits configured to carry the indication information, the indication bits being configured to represent the value n, in which a number of bits occupied by the indication bits is determined by a total number m of the preconfigured trigger reasons.

A computer readable storage medium is provided. When instructions stored in the storage medium are executed by a processor of a device, the device is enabled to perform the method for transmitting random access indication information described above. The method includes:

receiving a system message broadcasted by a base station, the system message comprising indication information, the indication information being configured to indicate trigger reason for a 2-step contention-based random access; and performing a 2-step contention-based random access in response to satisfying the trigger reason.

The instructions in the storage medium may further include:

the trigger reasons include business types and/or application scenarios.

The instructions in the storage medium may further include:

the indication information includes a value n, the value n indicating first n trigger reasons in preconfigured m trigger reasons, where n and m are predetermined parameters and are both integers;

performing the 2-step contention-based random access in response to satisfying the trigger reason includes:

performing the 2-step contention-based random access in response to satisfying at least one of the first n trigger reasons in the preconfigured m trigger reasons.

The instructions in the storage medium may further include:

the system message includes indication bits configured to carry the indication information, the indication bits being configured to represent the value n, in which a number of bits occupied by the indication bits is determined by a total number m of the preconfigured trigger reasons.

In exemplary embodiments, there is provided a device for transmitting random access indication information, including:

a processor; and a memory configured to store instructions executable by the processor;

in which, the processor is configured to:

determine whether a preset trigger reason is satisfied; and perform a 2-step contention-based random access when the preset trigger reason is satisfied.

A computer readable storage medium is provided. When instructions stored in the storage medium are executed by a processor of a device, the device is enabled to perform the method for transmitting random access indication information described above. The method includes:

determining whether a preset trigger reason is satisfied; and performing a 2-step contention-based random access when the preset trigger reason is satisfied.

Figure 10:
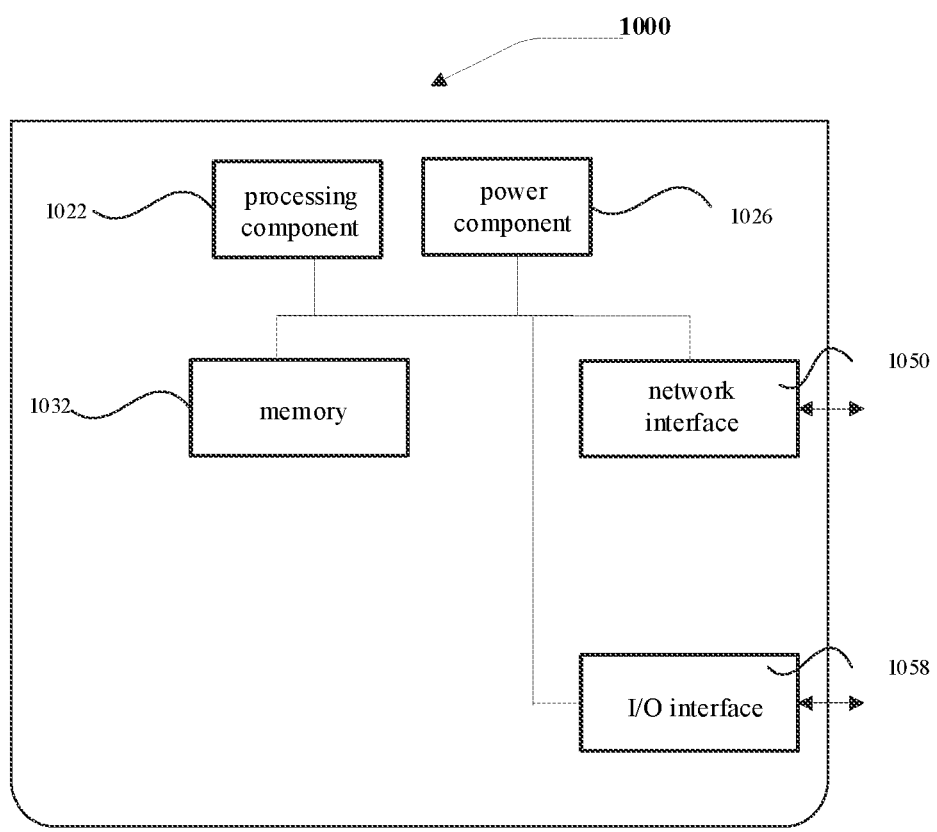
FIG. 10 is a block diagram of a device for transmitting random access indication information according to an exemplary embodiment.

FIG. 10 is a block diagram of a device 1000 for transmitting random access indication information according to an exemplary embodiment. For example, the device 1000 may be provided as a computer. Referring to FIG. 10, the device 1000 includes a processing component 1022 and memory resource represented by a memory 1032. The processing component 1022 further includes one or more processor. The memory 1032 is configured to store instructions executable by the processing component 1022, for example, application programs. The application programs stored in the memory 1032 may include one or more module each corresponding to a set of instructions. Furthermore, the processing component 1022 is configured to execute the instructions, for performing the above method.

The device 1000 may further include a power component 1026 configured to perform power management of the device 1000, a wired or wireless network interface 1050 configured to connect the device 1000 to network, and an input/output (I/O) interface 1058. The device 1000 may perform based on the operating system stored in the memory 1032, for example, Windows Server™, Mac OS X™, Unix™, Linux™, FreeBSD™ or the like.

In exemplary embodiments, there is provided a device for transmitting random access indication information, including:

a processor; and a memory configured to store instructions executable by the processor;

in which, the processor is configured to:

generate indication information about random access, the indication information being configured to indicate trigger reasons for a 2-step contention-based random access; and broadcast a system message to a user device, the system message including the indication information.

The above processor may be further configured as:

the trigger reasons include business types and/or application scenarios.

The above processor may be further configured as:

the indication information includes a value n, the value n indicating first n trigger reasons in preconfigured m trigger reasons, where n and m are predetermined parameters and are both integers.

The above processor may be further configured as:

the system message includes indication bits configured to carry the indication information, the indication bits being configured to represent the value n, in which a number of bits occupied by the indication bits is determined by a total number m of the preconfigured trigger reasons.

A computer readable storage medium is provided. When instructions stored in the storage medium are executed by a processor of a device, the device is enabled to perform the method for transmitting random access indication information described above. The method includes:

generating indication information about random access, the indication information being configured to indicate trigger reasons for a 2-step contention-based random access; and broadcasting a system message to a user device, the system message including the indication information.

The instructions in the storage medium may further include:

the trigger reasons include business types and/or application scenarios.

The instructions in the storage medium may further include:

the indication information includes a value n, the value n indicating first n trigger reasons in preconfigured m trigger reasons, where n and m are predetermined parameters and are both integers.

The instructions in the storage medium may further include:

the system message includes indication bits configured to carry the indication information, the indication bits being configured to represent the value n, in which a number of bits occupied by the indication bits is determined by a total number m of the preconfigured trigger reasons.

After considering the specification and practicing the disclosure disclosed herein, those skilled in the art will easily think of other embodiments of the present disclosure. This disclosure is intended to cover any variations, purposes, or adaptive changes of the present disclosure. These variations, purposes, or adaptive changes follow general principles of the present disclosure and include common knowledge or conventional technical means in the technical field not disclosed in the present disclosure. The description and the embodiments are only regarded as exemplary, and the true scope and spirit of the present disclosure are pointed out by the following claims.

It should be understood that the present disclosure is not limited to the precise structure that has been described above and illustrated in the drawings, and various modifications and changes can be made without departing from its scope. The scope of the present disclosure is only limited by the appended claims.

What is claimed is:

1. A method for transmitting random access indication information, comprising:
generating indication information about random access, the indication information being configured to indicate trigger reasons for a 2-step contention-based random access; and
broadcasting a system message from a base station to a user device, the system message comprising the indication information;
wherein the indication information comprises a value n, the value n indicating first n trigger reasons in preconfigured m trigger reasons, where n and m are predetermined parameters and are both integers;
wherein the system message comprises indication bits configured to carry the indication information, the indication bits being configured to represent the value n, in which a number of bits occupied by the indication bits is determined by a total number m of the preconfigured trigger reasons.

2. The method of claim 1, wherein the trigger reasons comprise business types and/or application scenarios.

3. A device for transmitting random access indication information implementing the method of claim 1, comprising:
a processor; and
a memory configured to store instructions executable by the processor;
wherein, the processor is configured to perform steps of the method of claim 1.

4. A method for transmitting random access indication information, comprising:
receiving, at a user device, a system message broadcasted by a base station, the system message comprising indication information, the indication information being configured to indicate trigger reason for a 2-step contention-based random access; and
performing a 2-step contention-based random access in response to satisfying the trigger reason;
wherein the indication information comprises a value n, the value n indicating first n trigger reasons in preconfigured m trigger reasons, where n and m are predetermined parameters and are both integers;
performing the 2-step contention-based random access in response to satisfying the trigger reason comprises:
performing the 2-step contention-based random access in response to satisfying at least one of the first n trigger reasons in the preconfigured m trigger reasons;
wherein the system message comprises indication bits configured to carry the indication information, the indication bits being configured to represent the value n, in which a number of bits occupied by the indication bits is determined by a total number m of the preconfigured trigger reasons.

5. The method of claim 4, wherein the trigger reasons comprise business types and/or application scenarios.

6. A device for transmitting random access indication information implementing the method of claim 4, comprising:
a processor; and
a memory configured to store instructions executable by the processor;
wherein, the processor is configured to perform steps of the method of claim 4.

7. A method for transmitting random access indication information, comprising:
determining, at a user device, whether a preset trigger reason is satisfied based on indication information included in a received system message; and
performing a 2-step contention-based random access when the preset trigger reason is satisfied;
wherein the indication information comprises a value n, the value n indicating first n trigger reasons in preconfigured m trigger reasons, where n and m are predetermined parameters and are both integers;
wherein the system message comprises indication bits configured to carry the indication information, the indication bits being configured to represent the value n, in which a number of bits occupied by the indication bits is determined by a total number m of the preconfigured trigger reasons.

8. A device for transmitting random access indication information implementing the method of claim 7, comprising:
a processor; and
a memory configured to store instructions executable by the processor;
wherein, the processor is configured to perform steps of the method of claim 7.

* * * * *